US010921634B2

(12) United States Patent
Gu et al.

(10) Patent No.: US 10,921,634 B2
(45) Date of Patent: Feb. 16, 2021

(54) DISPLAY PANEL AND DISPLAY DEVICE

(71) Applicants: Hefei BOE Optoelectronics Technology Co., Ltd., Hefei (CN); BOE Technology Group Co., Ltd., Beijing (CN)

(72) Inventors: Honggang Gu, Beijing (CN); Xianjie Shao, Beijing (CN); Jie Song, Beijing (CN); Zhen Zhang, Beijing (CN)

(73) Assignees: Hefei BOE Optoelectronics Technology Co., Ltd., Anhui (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/725,870

(22) Filed: Dec. 23, 2019

(65) Prior Publication Data
US 2020/0133052 A1 Apr. 30, 2020

Related U.S. Application Data

(63) Continuation-in-part of application No. 15/569,248, filed as application No. PCT/CN2017/083049 on May 4, 2017, now Pat. No. 10,551,663.

(30) Foreign Application Priority Data

Sep. 21, 2016 (CN) .......................... 201610838952.X

(51) Int. Cl.
*G02F 1/1335* (2006.01)
*G02F 1/1339* (2006.01)
(52) U.S. Cl.
CPC ...... *G02F 1/133512* (2013.01); *G02F 1/1339* (2013.01); *G02F 2201/503* (2013.01); *G02F 2202/22* (2013.01); *G02F 2202/28* (2013.01)

(58) Field of Classification Search
CPC ......... G02F 1/133512; G02F 1/133514; G02F 1/13338; G02F 1/1339; G02F 2201/503; G02F 2202/22; G06F 3/0412; G06F 3/044
See application file for complete search history.

(56) References Cited

U.S. PATENT DOCUMENTS 7,362,409 B2 * 4/2008 Tamatani ............ G02F 1/13394
349/154
2007/0263159 A1 * 11/2007 Kobayashi ........ G02F 1/133512
349/153
(Continued)

FOREIGN PATENT DOCUMENTS

CN 103048824 A 4/2013
CN 103926739 A 7/2014
(Continued)

OTHER PUBLICATIONS

Aug. 3, 2017—(WO) International Search Report and Written Opinion Appn PCT/CN2017/083049 with English Tran.
(Continued)

*Primary Examiner* — Vinh T Lam
(74) *Attorney, Agent, or Firm* — Banner & Witcoff, Ltd.

(57) ABSTRACT

A display panel and a display device are provided. The display panel has a display region and a peripheral region, a black matrix layer including a portion in the peripheral region; a first annular opening surrounding the display region and a second annular opening surrounding the first annular opening and on a side, away from the display region, of the first annular opening are provided in the portion of the black matrix layer; the first annular opening divides the portion of the black matrix layer into an inner part close to the display region and an outer part away from the display region; the second annular opening divides the outer part into a first part close to the display region and a second part
(Continued)

away from the display region; both the first annular opening and the second annular opening are closed annular.

20 Claims, 15 Drawing Sheets

(56) References Cited

U.S. PATENT DOCUMENTS

| | | | |
|---|---|---|---|
| 2010/0079718 A1* | 4/2010 | Sekiya | G02F 1/1339 |
| | | | 349/153 |
| 2012/0229736 A1* | 9/2012 | Osaki | G02F 1/1341 |
| | | | 349/96 |
| 2013/0088672 A1 | 4/2013 | Shin et al. | |
| 2015/0055067 A1 | 2/2015 | Kuramoto | |
| 2015/0346556 A1 | 12/2015 | Hirota et al. | |
| 2016/0109748 A1 | 4/2016 | Kim et al. | |
| 2016/0187718 A1 | 6/2016 | Shin | |
| 2016/0238866 A1* | 8/2016 | Yamaguchi | G02F 1/133512 |
| 2016/0274426 A1* | 9/2016 | Sun | G02F 1/136204 |
| 2016/0342049 A1* | 11/2016 | Zhan | G02F 1/133512 |
| 2016/0351631 A1 | 12/2016 | Lee | |
| 2017/0235395 A1* | 8/2017 | Long | G06F 3/0416 |
| | | | 345/174 |
| 2017/0255299 A1* | 9/2017 | Shimoshikiryoh | |
| | | | G02F 1/13338 |
| 2017/0285790 A1 | 10/2017 | Barel | |
| 2017/0307924 A1* | 10/2017 | Liu | G02F 1/1343 |
| 2018/0040607 A1* | 2/2018 | Xiong | H01L 27/0288 |

FOREIGN PATENT DOCUMENTS

| | | |
|---|---|---|
| CN | 103926742 A | 7/2014 |
| CN | 105425457 A | 3/2016 |
| CN | 106154632 A | 11/2016 |
| KR | 101255277 B1 | 4/2013 |

OTHER PUBLICATIONS

Sep. 5, 2017—(CN) First Office Action Appn 201610838952.X with English Tran.

\* cited by examiner

DISPLAY PANEL AND DISPLAY DEVICE

CROSS-REFERENCE TO RELATED APPLICATIONS

This application is a continuation-in-part of prior U.S. patent application Ser. No. 15/569,248, filed on Oct. 25, 2017, which is a U.S. National Phase Entry of International Application No. PCT/CN2017/083049 filed on May 4, 2017, designating the United States of America and claiming priority to Chinese Patent Application No. 201610838952.X, filed on Sep. 21, 2016. The present application claims priority to and the benefit of the above-identified applications and the above-identified applications are incorporated by reference herein in their entirety.

TECHNICAL FIELD

Embodiments of the present disclosure relate to a display panel and a display device.

BACKGROUND

Electrostatic Discharge (ESD) is one of main factors that affect a manufacturing yield of electronic products. In the electronic products, static electricity may be generated in many manners, for example, contact, friction, induction between devices, etc. When the static electricity in an electronic product is accumulated to a certain extent, the electrostatic discharge occurs, and electrostatic damage is caused. The electrostatic damage caused by the ESD to the electronic products includes sudden damage and potential damage. The sudden damage refers to that a device suffers a large degree of damage and the loss of function; and such damage can be usually found in a quality detection process in production of the electronic products. The potential damage refers to that a device suffers a small degree of damage and does not lose the function yet; and such damage is hard to be found in the quality detection process in the production of the electronic products. However, in the use process of the electronic products, the electronic products are caused to become instable in performance and shortened in service life.

In order to improve stability of the electronic products, the electronic products are generally subjected to an ESD reliability test in a production process. For example, a plurality of regions of an electronic product is detected by using an electrostatic gun to simulate an electrostatic environment where the electronic product possibly is in the use process of a user.

SUMMARY

Embodiments of the present disclosure provide a display panel and a display device, and the embodiments of the present disclosure can effectively prevent the static electricity to enter into the inside of the display panel and thus reduce the defects caused by static electricity.

An embodiment of the present disclosure provides a display panel. The display panel has a display region and a peripheral region on a periphery of the display region, and comprises an array substrate, an opposed substrate and a black matrix layer; the opposed substrate is opposite to the array substrate; the black matrix layer is between the array substrate and the opposed substrate, and the black matrix layer comprises a portion in the peripheral region, at least one opening in the peripheral region is provided in the black matrix layer; the at least one opening comprises a first annular opening and a second annular opening; the first annular opening surrounds the display region; the portion in the peripheral region of the black matrix layer is disconnected at a position of the first annular opening, the first annular opening divides the portion in the peripheral region of the black matrix layer into an inner part and an outer part which are not connected to each other, the inner part is on a side, close to the display region, of the first annular opening, and the outer part is on a side, away from the display region, of the first annular opening; the second annular opening surrounds the first annular opening and on a side, away from the display region, of the first annular opening; the outer part is disconnected at a position of the second annular opening, the second annular opening divides the outer part in the peripheral region into a first part and a second part which are not connected to each other, the first part is on a side, close to the display region, of the second annular opening, and the second part is on a side, away from the display region, of the second annular opening; both the first annular opening and the second annular opening are closed annular.

At least one embodiment of the present disclosure provides a display device which includes the above display panel.

At least one embodiment of the present disclosure provides a display panel. The display panel comprises a an array substrate, an opposed substrate and a black matrix layer; the opposed substrate is opposite to the array substrate; the black matrix layer is between the array substrate and the opposed substrate; the black matrix layer comprises a portion in the peripheral region, at least one opening in the peripheral region is provided in the black matrix layer, and the at least one opening comprises a first annular opening and a non-annular opening; the first annular opening surrounds the display region, the portion in the peripheral region of the black matrix layer is disconnected at a position of the first annular opening, the first annular opening divides the portion in the peripheral region of the black matrix layer into an inner part and an outer part which are not connected to each other, the inner part is on a side, close to the display region, of the first annular opening, and the outer part is on a side, away from the display region, of the first annular opening; the non-annular opening is in the outer part and is spaced from the first annular opening; the outer part is disconnected at a position of the non-annular opening, the non-annular opening comprises a first terminal and a second terminal, the first terminal is opposite to the second terminal in an extension direction of the non-annular opening, and both the first terminal and the second terminal are flush with an edge, away from the display region, of the black matrix layer; the non-annular opening divides the outer part into a first part and a second part which are not connected to each other, the first part is on a side, close to the display region, of the non-annular opening, and the second part is on a side, away from the display region, of the non-annular opening.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

FIGS. 2a and 2b are sectional schematic views along A-A in FIG. 1a;

FIGS. 6a and 6b are sectional schematic views along E-E in FIG. 5a;

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

A liquid crystal display is a common electronic product in people's lives, and usually includes a liquid crystal panel and a backlight source providing backlight for the liquid crystal panel. The liquid crystal panel includes an array substrate and an opposed substrate opposite to each other and a liquid crystal layer located therebetween. The liquid crystal panel controls light rays by controlling rotation of liquid crystal molecules in the liquid crystal layer, thereby realizing display. The ESD reliability test of the liquid crystal panel attracts a wide attention.

Figure 1A:
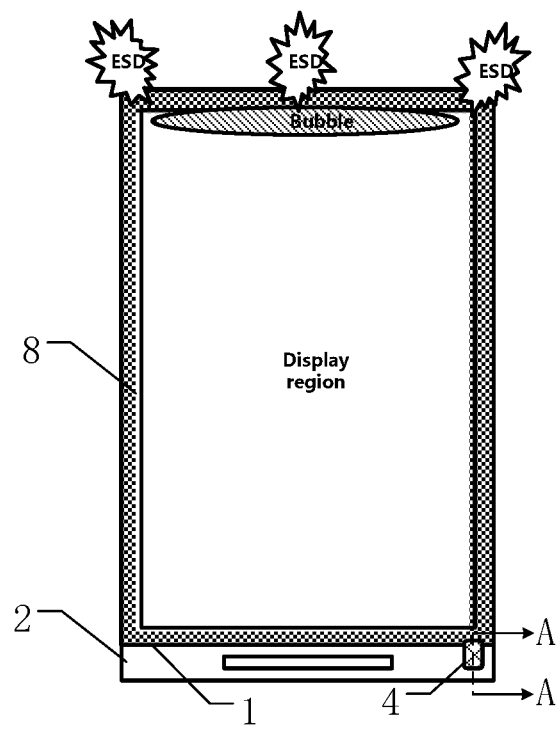
FIGS. 1a and 1b are schematic views of performing an ESD reliability test on a liquid crystal panel.
Figure 1B:
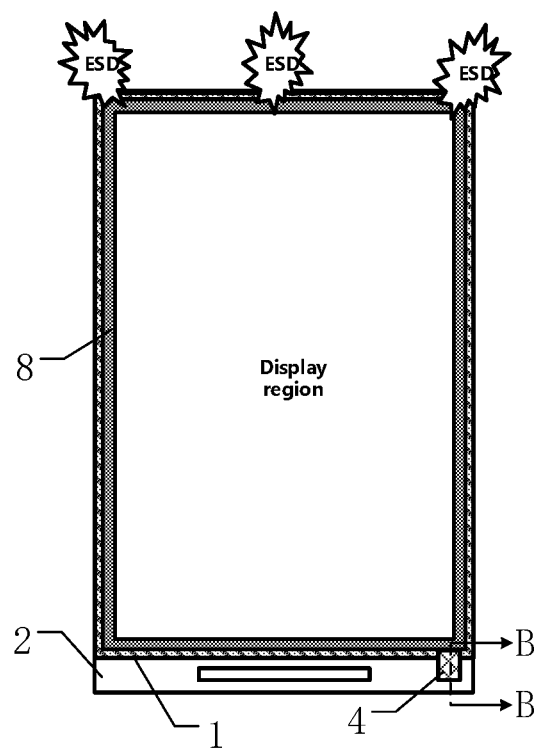

FIGS. 1a and 1b are schematic views of performing the ESD reliability test on the liquid crystal panel. As shown in FIGS. 1a and 1b, the liquid crystal panel includes an opposed substrate 1, an array substrate 2, a black matrix (BM) layer 8 located therebetween, and a conductive adhesive 4 connected to both the opposed substrate 1 and the array substrate 2, and the black matrix layer 8 includes parts respectively located inside and outside a display region of the liquid crystal panel. In FIG. 1a, an outer edge of the black matrix layer 8 overlaps an outer edge of the opposed substrate 1, that is, the black matrix layer 8 is disposed in an edge aligning manner; and in FIG. 1b, the outer edge of the black matrix layer 8 is located on an inner side of the outer edge of the opposed substrate 1, that is, the black matrix layer 8 is disposed in a non-edge aligning manner.

In the ESD reliability test process of the liquid crystal panel, when the black matrix layer 8 adopts any one of the above manners, the liquid crystal panel is easily subjected to electrostatic defect. Reasons for such electrostatic defect are explained in combination with FIGS. 2a to 2d.

Figure 2A:
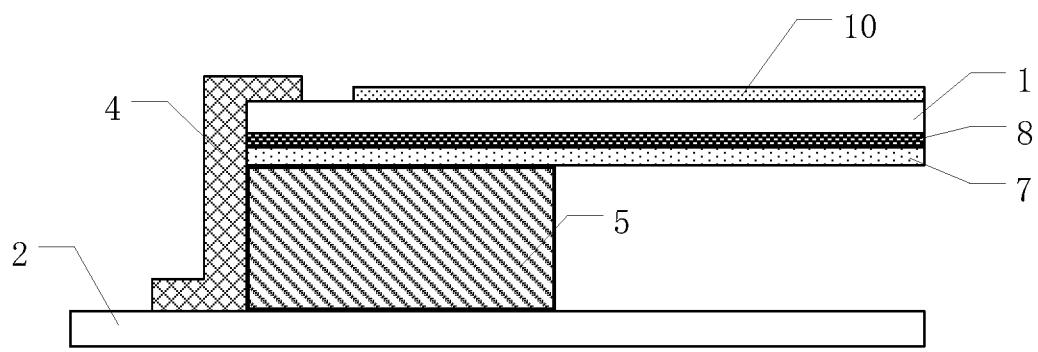
Figure 2B:
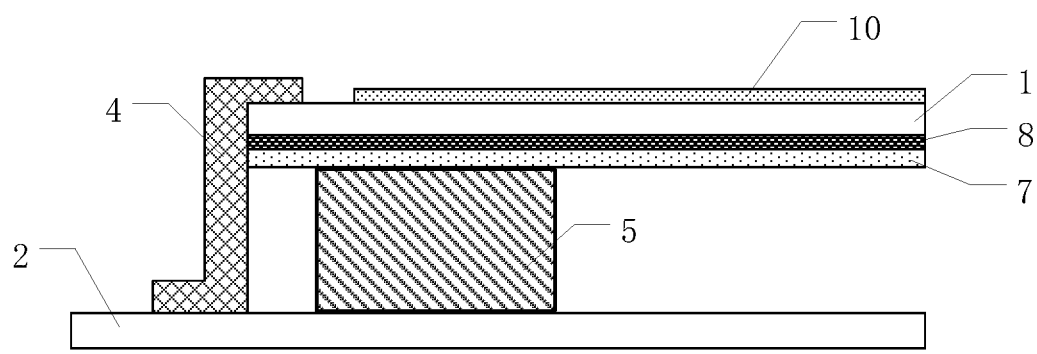
Figure 2C:
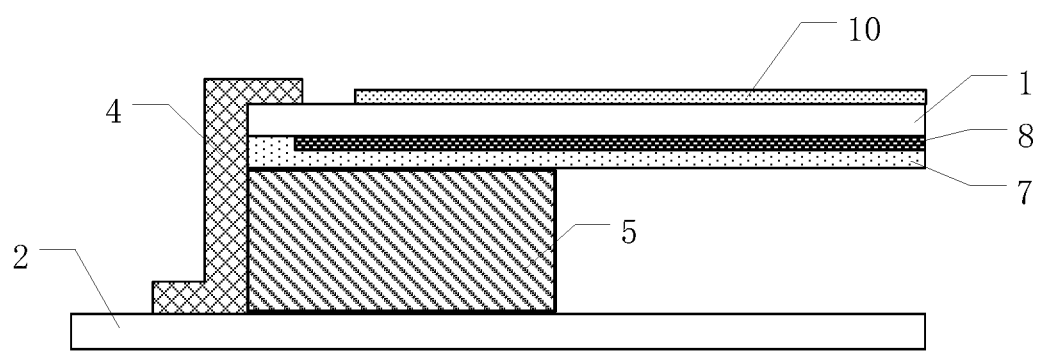
FIGS. 2c and 2d are sectional schematic views along B-B in FIG. 1b.
Figure 2D:
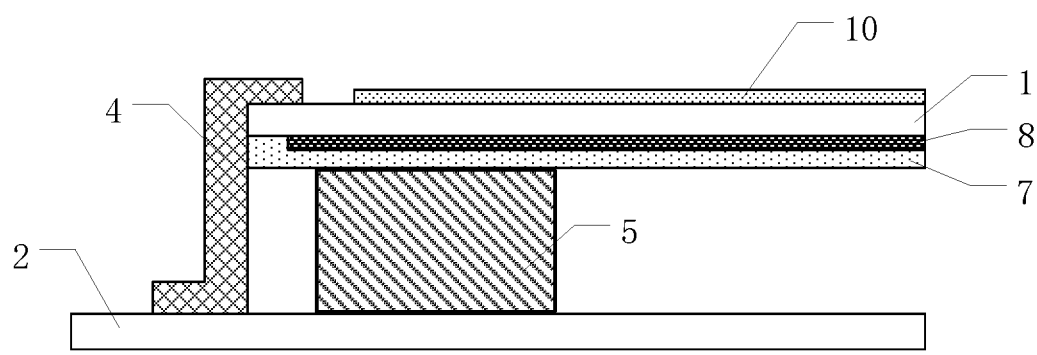

FIGS. 2a and 2b are sectional schematic views along A-A in FIG. 1a; and FIGS. 2c and 2d are sectional schematic views along B-B in FIG. 1b. As shown in FIGS. 2a to 2d, the opposed substrate 1 and the array substrate 2 are connected with each other by a sealant 5 to form a liquid crystal cell, both the black matrix layer 8 and a passivation layer 7 are between the opposed substrate 1 and the sealant 5, and a side of the opposed substrate 1 away from the array substrate 2 can be further provided with a polarization film 10. As shown in FIGS. 2a and 2c, an outer edge of the sealant 5 overlaps an outer edge of the opposed substrate 1, that is, the sealant 5 is disposed in an edge aligning manner; and in FIGS. 2b and 2d, the outer edge of the sealant 5 is located on an inner side of the outer edge of the opposed substrate 1, that is, the sealant 5 is disposed in a non-edge aligning manner.

For the liquid crystal panel as shown in FIGS. 2a and 2b, in a situation where the ESD reliability test is performed (for example, test positions are the positions labeled with "ESD" as shown in FIG. 1a), the black matrix layer 8 is in an edge-aligning manner and thus is in contact with the conductive adhesive 4, and the conductive adhesive 4 is connected to the grounding of the array substrate 2, and therefore, the conductive adhesive 4 can conduct the static electricity at an end far away from the ESD positions in FIG. 1a away. However, in the liquid crystal panel, since the black matrix layer 8 is in the edge-aligning manner, the black matrix layer 8 can conduct electricity in a case of greater static electricity. Therefore, the liquid crystal near the ESD positions may be polarized, and as a result, the defect such as bubbles occurs to the crystal liquid panel. In addition, the liquid crystal panel also easily enables the static electricity to enter a display region of the liquid crystal panel, and consequently, the phenomenon that circuits in the liquid crystal panel are burnt up due to the ESD easily happens, and as a result, display defect and the like are caused.

For the liquid crystal panel as shown in FIGS. 2c and 2d, although a material of the passivation layer 7 is filled between the black matrix layer 8 and the conductive adhesive 4, in a situation where the ESD reliability test is performed (for example, test positions are the positions labeled with "ESD" as shown in FIG. 1b), an ESD voltage may be more than kilovolts, such a voltage can break down the material of the passivation layer 7, and charges are enabled to be accumulated on the black matrix layer 8 in the display region of the liquid crystal panel; since the black matrix layer 8 cannot conduct the charges away, the charges will affect the control of electrodes in the liquid crystal panel over the rotation of the liquid crystal. Consequently, the liquid crystal panel is subjected to the defect such as greening, or even when the static electricity is too large, burning up of circuits in the liquid crystal panel may also be directly caused, and further poor display and the like are caused.

Figure 3A:
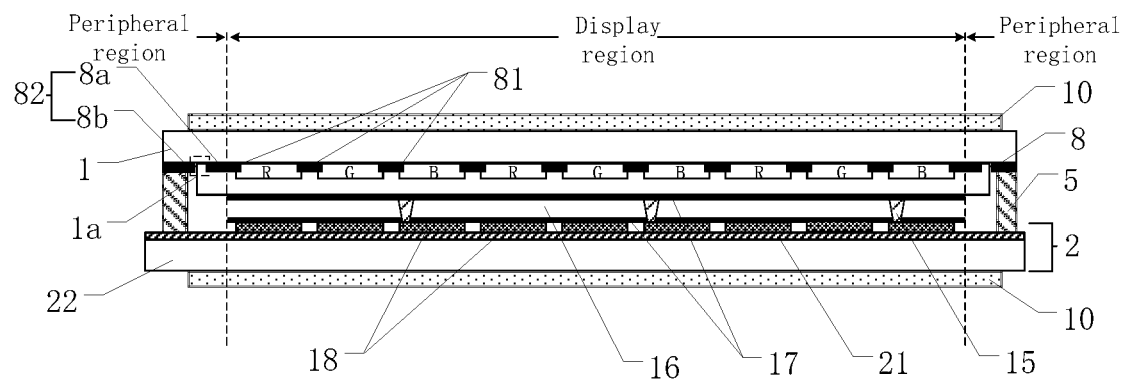
FIG. 3a is a sectional schematic view of a display panel provided by an embodiment of the present disclosure.
Figure 3B:
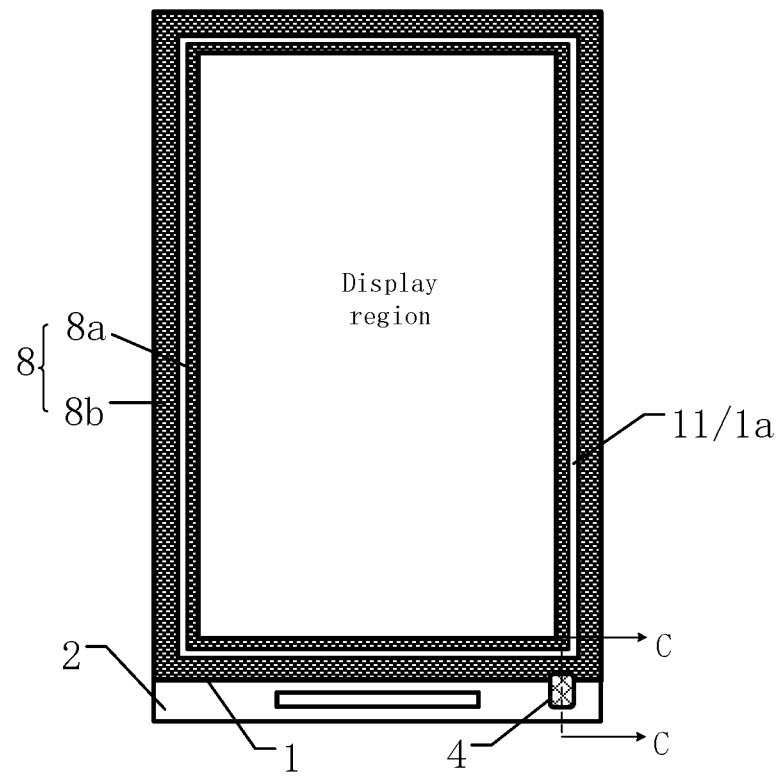
FIG. 3b is a schematic top view of a display panel provided by an embodiment of the present disclosure.
Figure 3C:
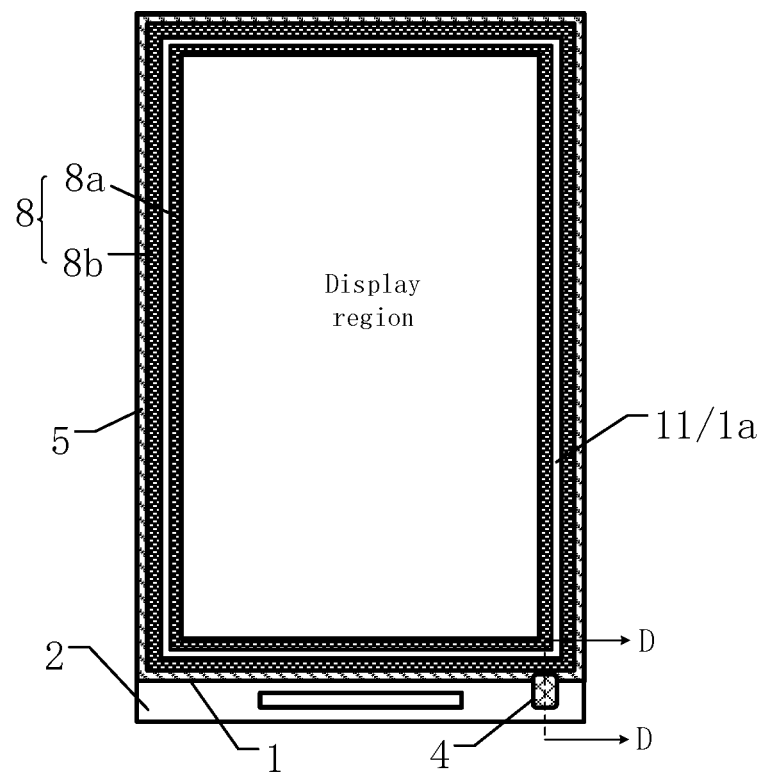
FIG. 3c is another schematic top view of a display panel provided by an embodiment of the present disclosure.

At least one embodiment of the present disclosure provides a display panel. As shown in FIGS. 3a to 3c, the display panel has a display region and a peripheral region located on a periphery of the display region, and the display panel includes: an array substrate 2; an opposed substrate 1 disposed opposite to the array substrate 2; a sealant 5, disposed in the peripheral region of the display panel and connecting the array substrate 2 to the opposed substrate 1 to enable the two to be disposed in a cell-assembly manner; and a black matrix layer 8, disposed between the opposed substrate 1 and the array substrate 2, for example, disposed on a side, facing the array substrate 2, of the opposed substrate 1.

The black matrix layer 8 comprises a portion in the peripheral region, in the portion in the peripheral region of the black matrix layer 8, at least one opening 1a located in the peripheral region is provided, and the portion in the peripheral region of the black matrix layer 8 is disconnected at a position of the at least one opening 1a, and as shown in FIG. 3a, the opening 1a penetrates through the black matrix layer 8, that is, a depth of the opening 1a equals to a thickness of the black matrix layer 8; besides, the at least one opening 1a includes a first annular opening 11 which is disposed between the sealant 5 (referring to FIGS. 3a and 3c) and the display region of the display panel and surrounds the display region (as shown in FIGS. 3b and 3c). The first annular opening 11 has a closed annular structure, that is, a planar shape of the first annular opening 11 is closed annular, and the first annular opening 11 divides the portion in the peripheral region of the black matrix layer 8 into an inner part 8a and an outer part 8b which are not connected to each other. An outer edge of the inner part 8a of the black matrix layer 8 is between the first annular opening 11 and the display region, that is, the inner part is on a side, close to the display region, of the first annular opening; the outer part 8b of the black matrix layer 8 is located on a side, away from the display region, of the first annular opening 11.

The embodiment of the present disclosure provides an anti-electrostatic design; by forming the first annular opening 11 in the black matrix layer 8 in the peripheral region, the portion in the peripheral region of the black matrix layer 8 is divided into the inner part 8a and the outer part 8b which are not connected to each other, such that the static electricity at the outer part 8b is hard to reach the inner part 8a, and thus the static electricity is difficult to enter the display region from the peripheral region. The first annular opening 11 is between the sealant 5 and the display region, so the static electricity, after entering the peripheral region, is weakened at first on the outer part 8b of the black matrix layer 8, and is weakened again at the first annular opening 11, and therefore, the static electricity is difficult to enter the display region. Therefore, the anti-electrostatic design provided by the embodiment of the present disclosure can effectively prevent the static electricity from entering the display region, thereby effectively reduce the electrostatic defect of the display panel.

It should be noted that, as shown in FIG. 3a, the black matrix layer 8 includes a display region black matrix layer 81 located in the display region and a peripheral black matrix layer 82 which is located in the peripheral region and includes the inner part 8a and the outer part 8b, and FIGS. 3a and 3b show the peripheral black matrix layer but do not show the display region black matrix layer.

Besides, in the display region, the display region black matrix layer 81 has a lattice-like structure; the array substrate is provided with a plurality of gate lines and a plurality of data lines, the gate lines and the data lines intersect with each other to form a plurality of pixel opening regions, the pixel opening regions are not shielded by the display region black matrix layer, and regions between the adjacent pixel opening regions are shielded by the display region black matrix layer. In such case, the display region includes the pixel opening regions and regions between adjacent pixel opening regions.

For example, the display panel provided by the embodiment of the present disclosure is a liquid crystal panel; in such case, as shown in FIG. 3a, a liquid crystal layer 16 and a spacer 15 for keeping a cell gap of the display panel are disposed between the opposed substrate 1 and the array substrate 2; alignment films 17 are disposed on both sides of the liquid crystal layer 16, and the alignment films 17 for example are polyimide films, and are used for performing prealignment on liquid crystal molecules in the liquid crystal layer 16 after being subjected to friction processing; a base substrate 22 of the array substrate 2 is provided with electrodes 18 and a metal wire 21, the electrodes 18 are used for controlling the rotation of the liquid crystal molecules in the liquid crystal layer 16, and the metal wire 21 is used for transmitting a signal; and polarization films 10 are respectively disposed on a side of the opposed substrate 1 away from the array substrate 2 and a side of the array substrate 2 away from the opposed substrate 1. The display panel can further include other structures, for example, a color filter layer for filtering light rays (it, for example, includes a red color filter pattern R, a green color filter pattern G and a blue color filter layer B, etc., referring to FIG. 3a), etc. The embodiments of the display panel include, but not limited to, the liquid crystal panel, or can be other display panels including the black matrix layer.

For example, in at least one embodiment of the present disclosure, as shown in FIGS. 3b and 3c, the display panel further includes a conductive adhesive 4, for example, a silver adhesive; the conductive adhesive 4 is on an outer side of the sealant 5 (referring to FIG. 3c), that is, the conductive adhesive 4 is on a side, away from the display region, of the sealant 5, and the conductive adhesive 4 is connected to each of the opposed substrate 1 and the array substrate 2, and for example, the conductive adhesive 4 can be grounded. The grounded conductive adhesive 4 can conduct static charges on the display panel out, so as to reduce a probability that the electrostatic discharge occurs on the display panel.

Figure 4A:
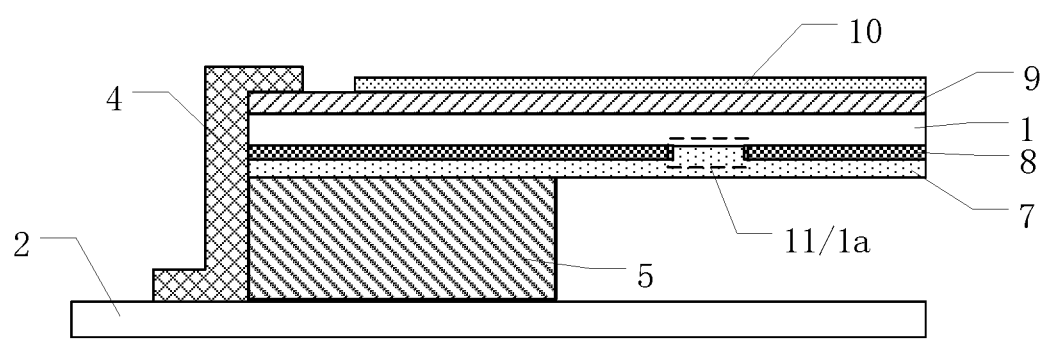
FIGS. 4a and 4b are sectional schematic views along C-C in FIG. 3b.
Figure 4B:
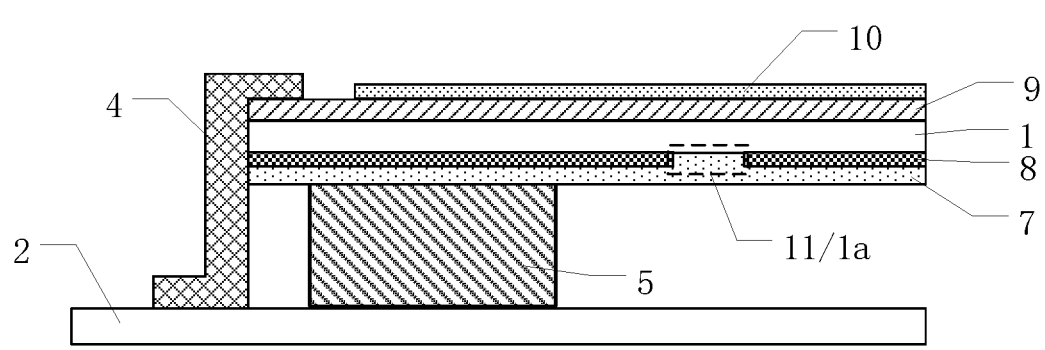
Figure 4C:
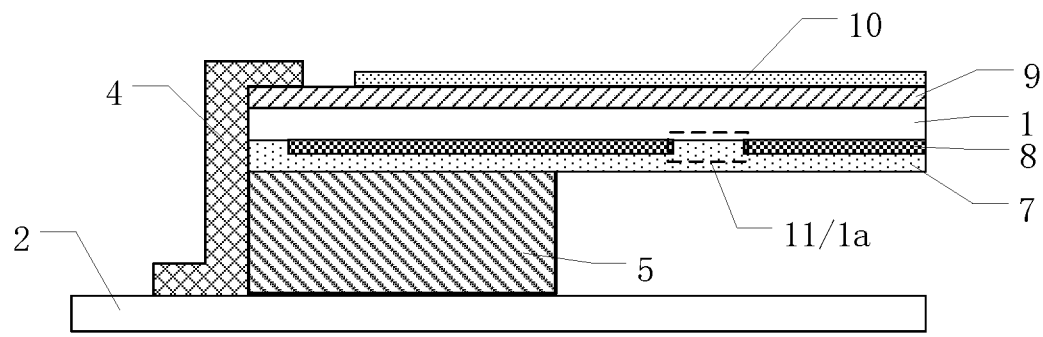
FIGS. 4c and 4d are sectional schematic views along D-D in FIG. 3c.
Figure 4D:
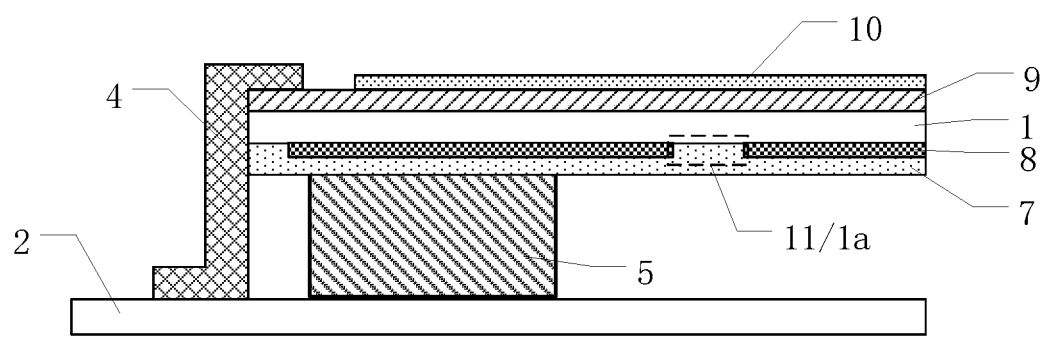

FIGS. 4a and 4b are sectional schematic views along C-C in FIG. 3b; and FIGS. 4c and 4d are sectional schematic views along D-D in FIG. 3c. For example, in the display panel provided by the embodiment of the present disclosure, the black matrix layer 8 can be disposed in an edge-aligning manner (as shown in FIGS. 3b, 4a and 4b) or in a non-edge aligning manner (as shown in FIGS. 3c, 4c and 4d); and for example, the sealant 5 can be disposed in an edge-aligning manner (as shown in FIGS. 4a and 4c) or in a non-edge aligning manner (as shown in FIGS. 4b and 4d).

For example, as shown in FIGS. 4a to 4d, the display panel provided by at least one embodiment of the present disclosure further includes an electrostatic shielding layer 9, and the electrostatic shielding layer 9 is on a side, away from the array substrate 2, of the opposed substrate 1. For example, the electrostatic shielding layer 9 can be connected to the conductive adhesive 4 to conduct the static electricity out. The electrostatic shielding layer 9 can play a role of electrostatic protection on the display panel, so as to weaken an intensity of the static electricity reaching the first annular opening 11, such that the static electricity does not easily pass through the first annular opening 11, so as to not easily enter the display region.

For example, the electrostatic shielding layer 9 is a transparent conductive layer formed in a whole surface manner. For example, the electrostatic shielding layer 9 can be manufactured by adopting an ITO (Indium Tin Oxide) or other similar transparent conductive material, to reduce an influence on a transmittance of the display panel.

For example, as shown in FIGS. 4a to 4d, the display panel provided by at least one embodiment of the present disclosure can further include a passivation layer 7 disposed on a side, facing the array substrate 2, of the black matrix layer 8, and the passivation layer 7 plays a planarization role and for example is manufactured by adopting an optical clear adhesive (OCA).

Figure 5A:
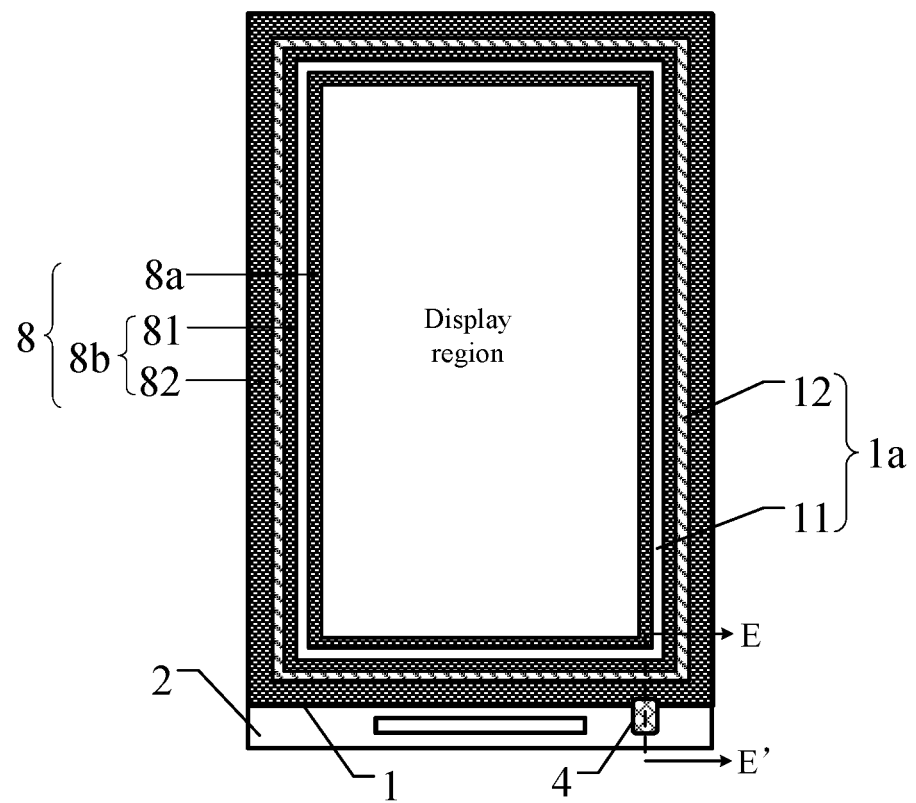
FIG. 5a is a schematic top view illustrating that a display panel includes a first annular opening and a second annular opening provided by an embodiment of the present disclosure.
Figure 5B:
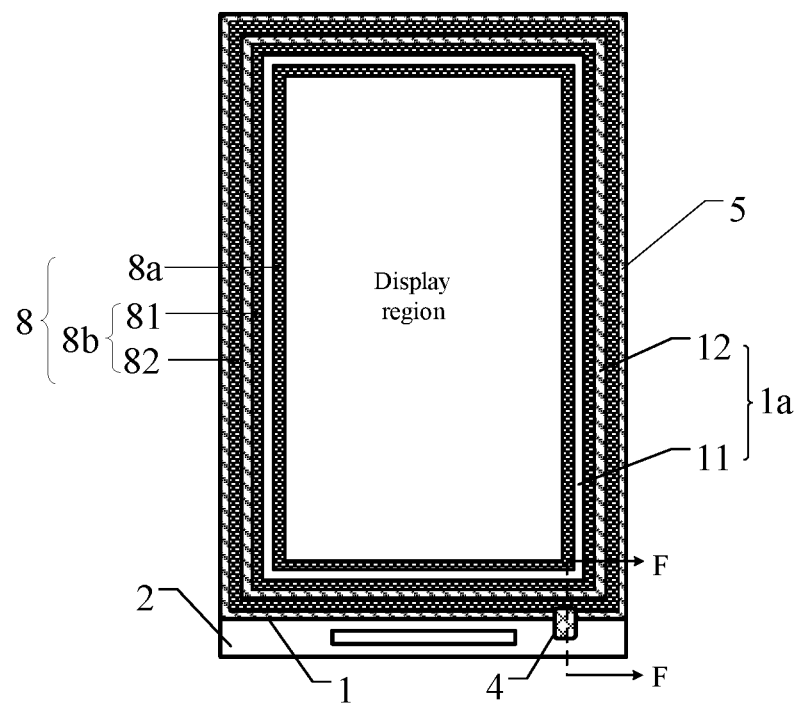
FIG. 5b is a schematic top view illustrating that a display panel includes a first annular opening and a second annular opening provided by an embodiment of the present disclosure.

For example, in at least one embodiment of the present disclosure, as shown in FIGS. 5a and 5b, besides the first annular opening 11, the at least one opening 1a can further include a closed second annular opening 12 which is disposed in the portion in the peripheral region of the black matrix 8 and surrounds both the display region and the first annular opening 11, and the second annular opening 12 is on a side, away from the display region, of the first annular opening 11; the outer part is disconnected at a position of the second annular opening, the second annular opening divides the outer part 8a in the peripheral region into a first part 81 and a second part 82 which are not connected to each other, the first part 81 is on a side, close to the display region, of the second annular opening 12, and the second part 82 is on a side, away from the display region, of the second annular opening 12. In the embodiment illustrated in FIG. 5a, both the first annular opening 11 and the second annular opening 12 are closed annular.

In this embodiment, the conductive adhesive 4 is electrically connected to the second part 82 of the black matrix layer 8, and the conductive adhesive 4 is grounded, and the conductive adhesive 4 is on a side, away from the display region, of the sealant 5.

Figure 6A:
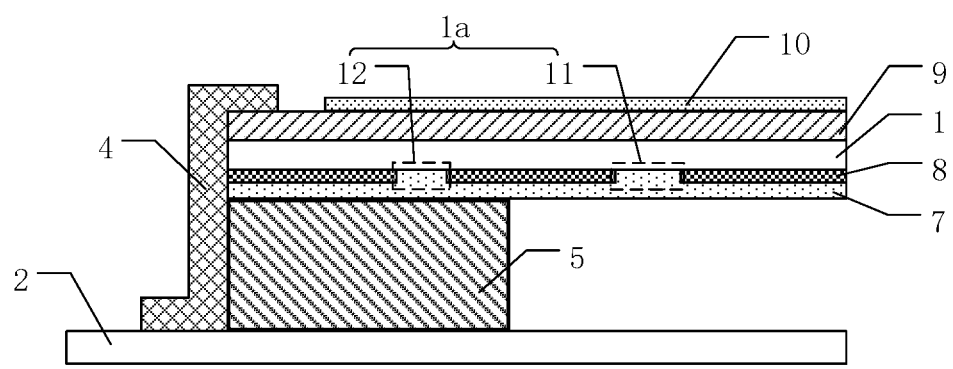
Figure 6B:
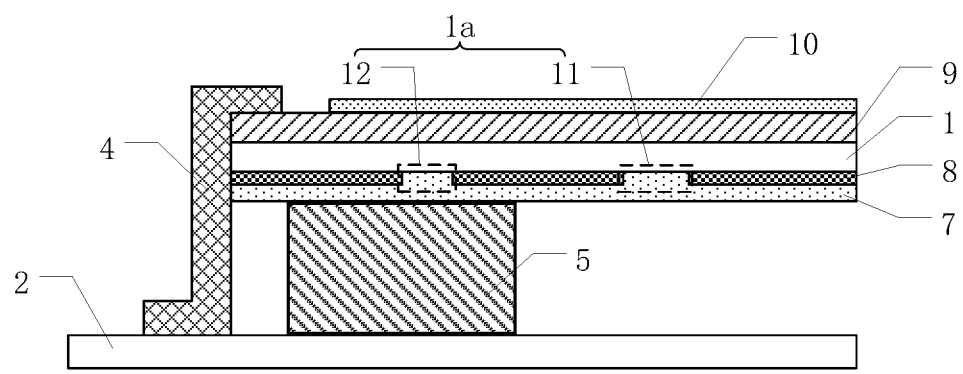

The first annular opening 11 is between the sealant 5 and the display region in the embodiment illustrated in FIG. 6a-6b. Of course, the first annular opening 11 may at least partially overlaps the sealant 5 in another embodiment of the present disclosure. The second annular opening 12 at least partially overlaps the sealant 5 in a direction perpendicular to the opposed substrate 1, for example, the two totally overlap, and for example, in such case, the second annular opening 12 can be filled with the sealant 5. Of course, in another embodiment, the second annular opening 12 does not overlap the sealant 5 in the direction perpendicular to the array substrate. The first annular opening 11 and the second annular opening 12 divide the black matrix layer 8 in the peripheral region into three parts which are not connected to each other. In such case, the static electricity is weakened at the second annular opening 12 at first and is then weakened again during the process of passing through the black matrix layer between the first annular opening and the second annular opening, and afterwards, the static electricity is weakened again at the first annular opening 11. Thus it is not easy for the static electricity to reach the display region, or to enter the display region even if the static electricity reaches the display region. In another aspect, the sealant 5 is formed by curing/solidifying a liquid adhesive material, and the second annular opening 12 is disposed to at least partially overlap the sealant 5, such that the liquid adhesive material for forming the sealant 5 can seep into a gap between the black matrix layer 8 and the opposed substrate 1 in the second annular opening 12 in a manufacturing process. Therefore, after the sealant 5 is cured, it is not easy for the static electricity to pass through the second annular opening 12. Hence, by adding the second annular opening 12 on the basis of providing the first annular opening 11, the static electricity is more effectively prevented from entering the display region, thereby more effectively reducing a condition of electrostatic defect of the display panel.

Figure 6C:
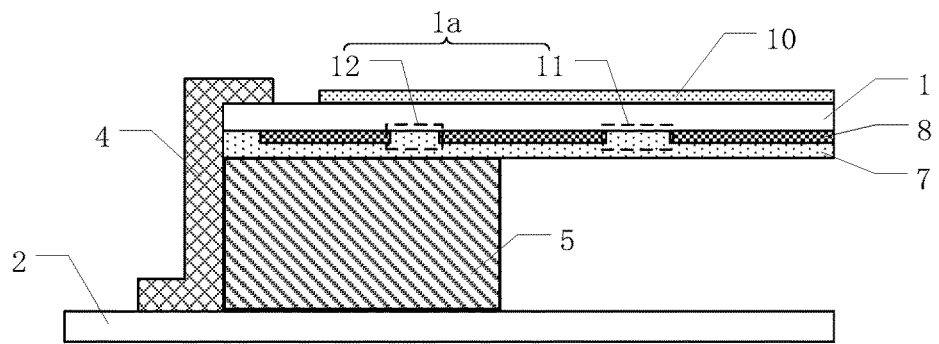
FIGS. 6c and 6d are sectional schematic views along F-F in FIG. 5b.
Figure 6D:
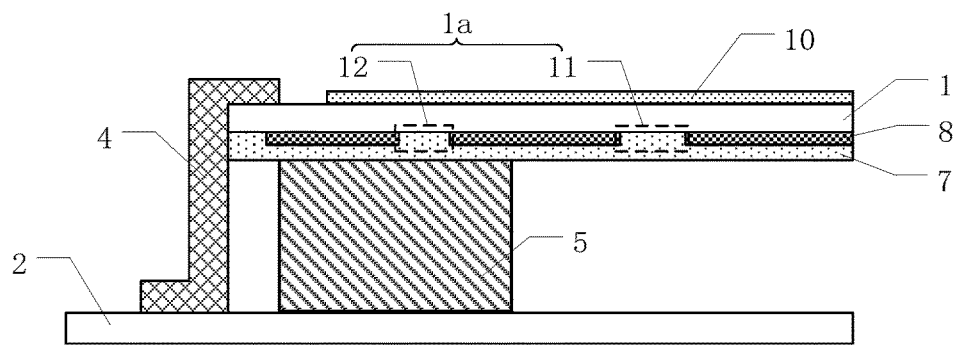

FIGS. 6a and 6b are sectional schematic views along E-E in FIG. 5a; and FIGS. 6c and 6d are sectional schematic views along F-F in FIG. 5b. For example, in the display panel provided by the embodiment of the present disclosure, the black matrix layer 8 can be disposed in an edge-aligning manner (as shown in FIGS. 5a, 6a and 6b) or in a non-edge aligning manner (as shown in FIGS. 5b, 6c and 6d). For example, the sealant 5 can also be disposed in an edge-aligning manner (as shown in FIGS. 6a and 6c) or in a non-edge aligning manner (as shown in FIGS. 6b and 6d). For example, as shown in FIGS. 6a to 6d, the second annular opening 12 can be disposed between an inner edge and an outer edge of the sealant 5; or an inner edge of the sealant 5 can be disposed between an inner edge and an outer edge of the second annular opening 12, and in such case, the second annular opening 12 partially overlaps the sealant 5 in a direction perpendicular to the array substrate, which is beneficial to forming a narrower frame of the display panel.

For example, as illustrated in FIG. 5a, the black matrix layer 8 comprises a portion in the peripheral region, the second annular opening 12 is in the black matrix layer 8, such that the display panel has a relatively strong anti-electrostatic capacity. Therefore, the display panel provided by at least one embodiment of the present disclosure can include an electrostatic shielding layer 9 (as shown in FIGS. 6a and 6b) or may not include the electrostatic shielding layer (as shown in FIGS. 6c and 6d).

The features that not mentioned of the embodiment illustrated in FIG. 5a and technical effects thereof are all the same as those described in the above-mentioned embodiments, and can be referred to the above descriptions.

Figure 7A:
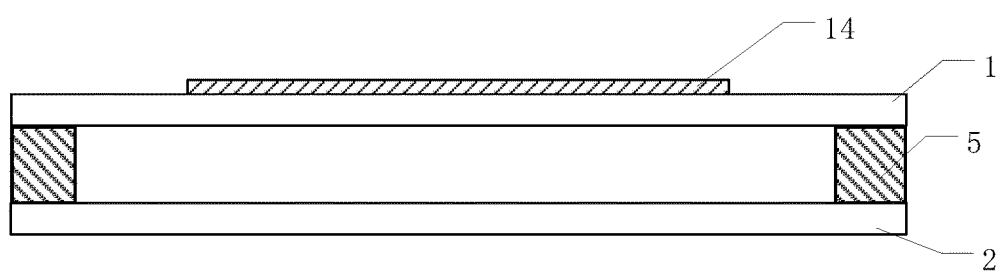
FIG. 7a is a sectional schematic view of a local structure of a display panel which is an on-cell type touch control display panel provided by an embodiment of the present disclosure.

For example, in a case that the display panel does not include the electrostatic shielding layer, the display panel can be an on-cell touch control display panel, for example, a single-layer on-cell (SLOC) touch control display panel. For example, as shown in FIG. 7a, the display panel can further include a touch electrode layer 14 disposed on the opposed substrate 1 and used for realizing a touch control function, and the touch electrode layer 14 is on a side, away from the array substrate 2, of the opposed substrate 1.

Figure 7B:
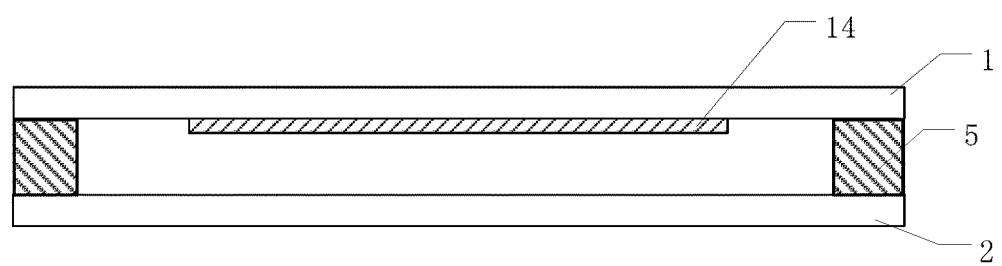
FIG. 7b is a sectional schematic view of a local structure of a display panel which is an in-cell type touch control display panel provided by an embodiment of the present disclosure.

For example, in a case that the display panel does not include the electrostatic shielding layer, the display panel can also be an in-cell touch control display panel, for example, a full-in-cell touch control display panel. For example, as shown in FIG. 7b, the touch electrode layer 14 that the display panel includes can be disposed on a side, facing the array substrate 2, of the opposed substrate 1; or for example, the touch electrode layer 14 is on the array substrate 2.

For example, the touch electrode layer 14 can be manufactured by adopting an ITO (Indium Tin Oxide) or other similar transparent conductive material, so as to reduce an influence on the transmittance of the display panel. For example, the touch electrode layer 14 can be implemented as a self-capacitance mode or mutual-capacitance mode.

Figure 8:
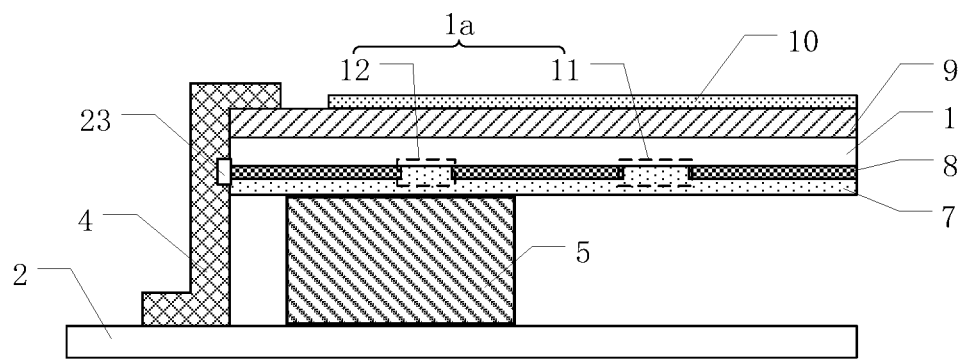
FIG. 8 is a sectional schematic view illustrating that a groove is in a conductive adhesive in a display panel provided by an embodiment of the present disclosure.

For example, in at least one embodiment of the present disclosure, as shown in FIG. 8, a groove 23 is in the conductive adhesive 4 that the display panel includes, and the groove 23 separates the conductive adhesive 4 from the black matrix layer 8. In the embodiment of the present disclosure, particularly in a case that the black matrix layer 8 is disposed in the edge-aligning manner, by providing the groove 23 in the conductive adhesive 4, the contact between the conductive adhesive 4 and the black matrix layer 8 can be avoided, therefore, not only is the grounding of the black matrix layer 8 avoided, but also it is favorable for preventing the static electricity from reaching the black matrix layer 8 through the conductive adhesive 4.

Figure 9:
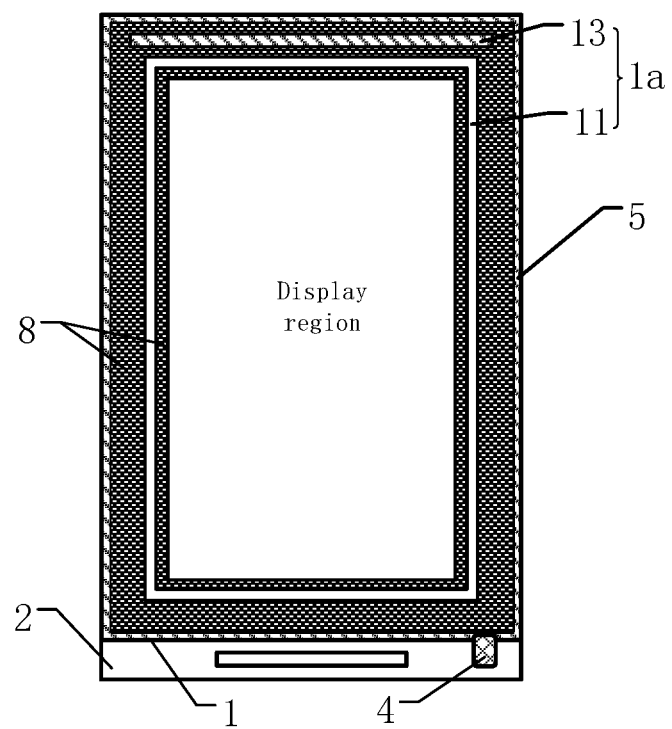
FIG. 9 is a schematic top view illustrating that a display panel includes a non-annular opening provided by an embodiment of the present disclosure.

For example, in at least one embodiment of the present disclosure, as shown in FIG. 9, the at least one opening 1a disposed in the black matrix layer of the display panel can further include a non-annular opening 13 spaced from the first annular opening 11, for example, the non-annular opening 13 has a non-closed structure and is on a part of the periphery of the display region instead of surrounding the whole display region. The non-annular opening 13 at least partially overlaps the sealant 5 in a direction perpendicular to the opposed substrate 1, for example, the non-annular opening 13 is between the inner edge and the outer edge of the sealant 5, or the inner edge of the sealant 5 is between the inner edge and the outer edge of the non-annular opening; or the non-annular opening 13 is between the sealant 5 and the display region of the display panel. On the basis that the first annular opening 11 is disposed, by providing the non-annular opening 13, not only is the anti-electrostatic capacity of the display panel further improved, but also it is favorable to realize a narrow frame design.

For example, as shown in FIG. 9, the non-annular opening 13 can be disposed at an upper frame opposite to a lower frame where the conductive adhesive 4 is, or disposed at the lower frame, such that it is favorable for the two side frames to realize the narrow frame design. A position of the non-annular opening 13 includes, but not limited to, the upper frame or the lower frame. The position and quantity of the non-annular openings 13 can be set according to actual needs.

When the display panel provided by the embodiment of the present disclosure displays, required backlight is provided by a backlight source disposed on the back side of the display panel. Since the first annular opening 11 in the black matrix layer 8 is between the sealant 5 and the display region, it is possible that light emitted by the backlight source transmits through the first annular opening 11 to affect a display effect. Therefore, in order to reduce light leakage at the first annular opening 11, for example, in at least one embodiment of the present disclosure, a distance between the first annular opening 11 that the display panel includes and the display region can be greater than or equal to 50 micrometers (μm), for example, greater than or equal to 100 micrometers.

Figure 10:
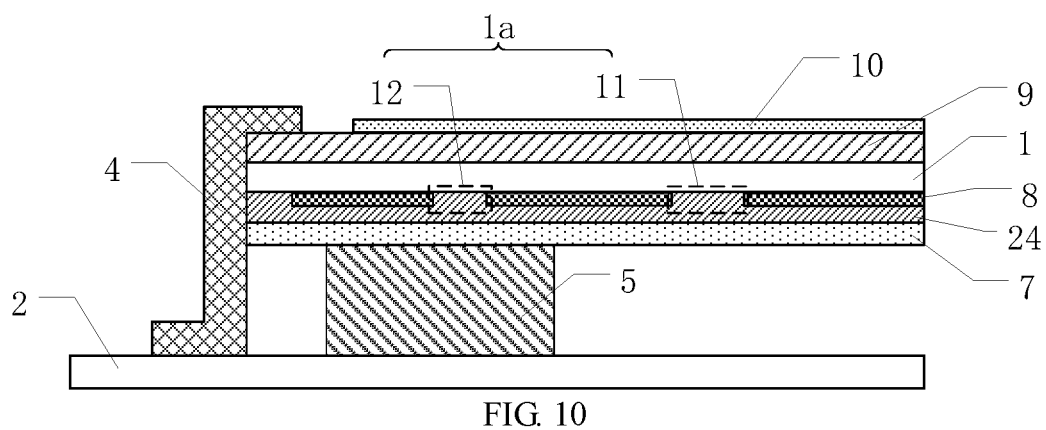
FIG. 10 is a sectional schematic view illustrating that a display panel includes a light-shielding layer provided by an embodiment of the present disclosure.

For example, in order to reduce the light leakage at the first annular opening 11, in at least one embodiment of the present disclosure, as shown in FIG. 10, the display panel further includes a light-shielding layer 24 which shields at least a part of light and is disposed between the opposed substrate 1 and the array substrate 2, and the light-shielding layer 24 overlaps the first annular opening 11 in the direction perpendicular to the opposed substrate 1 to shield the first annular opening 11. For example, the light-shielding layer 24 can be disposed on a side, facing the array substrate 2, of the opposed substrate 1, as shown in FIG. 10; or the light-shielding layer 24 can be disposed on a side, facing the opposed substrate 1, of the array substrate 2.

For example, the light-shielding layer 24 can be a color filter layer overlapping the first annular opening 11, and such color filter layer for example includes a red color filter pattern, a green color filter pattern and a blue color filter pattern, referring to FIG. 3*a*. That is to say, the color filter layer located in the display region of the display panel extends to the peripheral region to overlap the first annular opening 11. For example, the color filter layer can be disposed on a side, facing the array substrate 2, of the opposed substrate 1, as shown in FIG. 10. The color filter layer has a light filtering function, such that the light leakage at the first annular opening 11 can be reduced; in another aspect, the color filter layer located in the display region extends into the peripheral region to shield the first annular opening 11, so that there is no need to add an extra film manufacturing process, and a manufacturing process is simple.

For example, the blue color filter pattern that the color filter layer includes can overlap the first annular opening 11. A transmittance of the blue color filter pattern is low, therefore, the light leakage at the first annular opening can be better reduced by overlapping the blue color filter pattern with the first annular opening.

For example, the light-shielding layer 24 can be a metal layer overlapping the first annular opening 11. For example, the metal layer is on a side, facing the opposed substrate 1, of the array substrate 2. Since the array substrate 2 is provided with the metal layer for forming a metal wire (referring to 21 in FIG. 3), the metal layer is enabled to extend to the peripheral region to shield the first annular opening 11, there is no need to add an extra film manufacturing process, and the manufacturing process is simple. For example, the metal layer can be manufactured by aluminum, aluminum-neodymium alloy, copper, titanium, molybdenum, molybdenum-niobium alloy or a similar metal material.

On the basis that the light-shielding layer 24 overlaps the first annular opening 11, the light-shielding layer 24 can also overlap other openings in the at least one opening above to further reduce the light leakage.

FIG. 11*a*-11*e* respectively illustrate display panels including a first annular opening, a second annular opening and a plurality of non-annular openings provided by embodiments of the present disclosure; FIGS. 12*a* and 12*b* are sectional schematic views along any one of F-F' in FIG. 11*a*, G-G' in FIG. 11*b*, H-H' in FIG. 11*c*, I-I' in FIG. 11*d*.

Figure 11A:
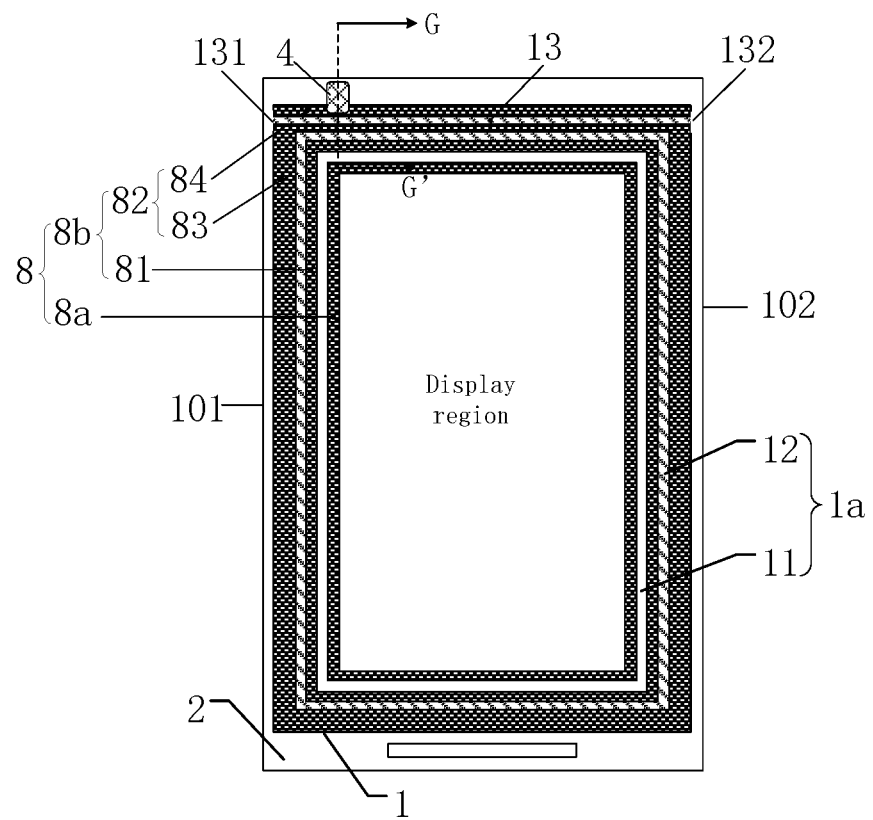
FIG. 11a is a schematic top view of a display panel including a first annular opening, a second annular opening and a non-annular opening provided by an embodiment of the present disclosure.
Figure 12A:
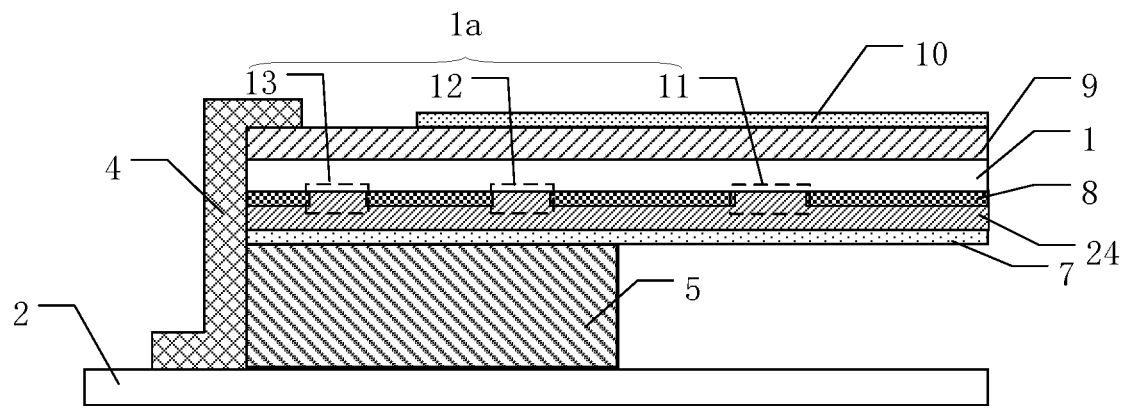
FIGS. 12a and 12b are sectional schematic views along any one of F-F' in FIG. 11a, G-G' in FIG. 11b, H-H' in FIG. 11c, I-I' in FIG. 11d.
Figure 12B:
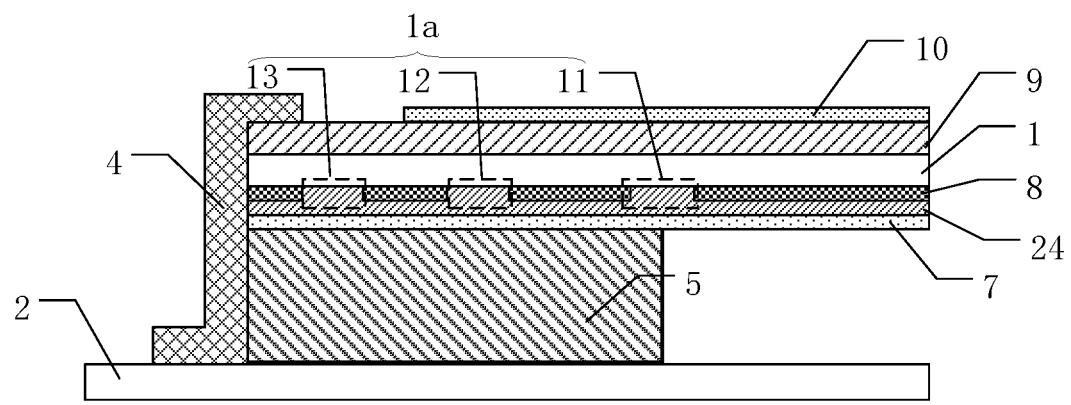

As illustrated in FIG. 11*a* and FIG. 12*a*, further comprising a non-annular opening 13, the non-annular opening 13 in the second part 82 of the black matrix layer, and is spaced apart from the second annular opening 12. The second part 82 is disconnected at a position of the non-annular opening 13, the non-annular opening 13 comprises a first terminal 131 and a second terminal 132, the first terminal 131 is opposite to the second terminal 132 in an extension direction of the non-annular opening 13, and both the first terminal 131 and the second terminal 132 are flush with an edge 80, away from the display region, of the black matrix layer 8; the non-annular opening 13 divides the second part 82 into a third part 83 and a fourth part 84 which are not connected to each other, the third part 83 is on a side, close to the display region, of the non-annular opening 13, and the fourth part 84 is on a side, away from the display region, of the non-annular opening 13; the fourth part 84 is electrically connected to the conductive adhesive 4. On the basis that the first annular opening 11 is disposed, by providing the above-mentioned non-annular opening 13, the conductive adhesive 4 can conduct the static electricity at the end far away from the ESD positions in FIG. 1*a* away, and the static electricity can be further prevented from entering the display region of the display panel.

For example, a planar shape of the display panel is a rectangle, the first terminal 131 of the non-annular opening 13 is close to a first edge 101 of the rectangle, and the second terminal 132 of the non-annular opening 13 is close to a second edge 102 of the rectangle. For example, as illustrated in FIG. 11*a*, the first edge 101 and the second edge 102 are opposite to each other. For example, a planar shape of an entirety of the non-annular opening 13 is a straight strip. In this case, at all positions of the fourth part 84 in the extension direction of the non-annular opening 13, the static electricity can be further prevented from entering the display region of the display panel, and meanwhile it is favorable to realize a narrow frame design.

Figure 11B:
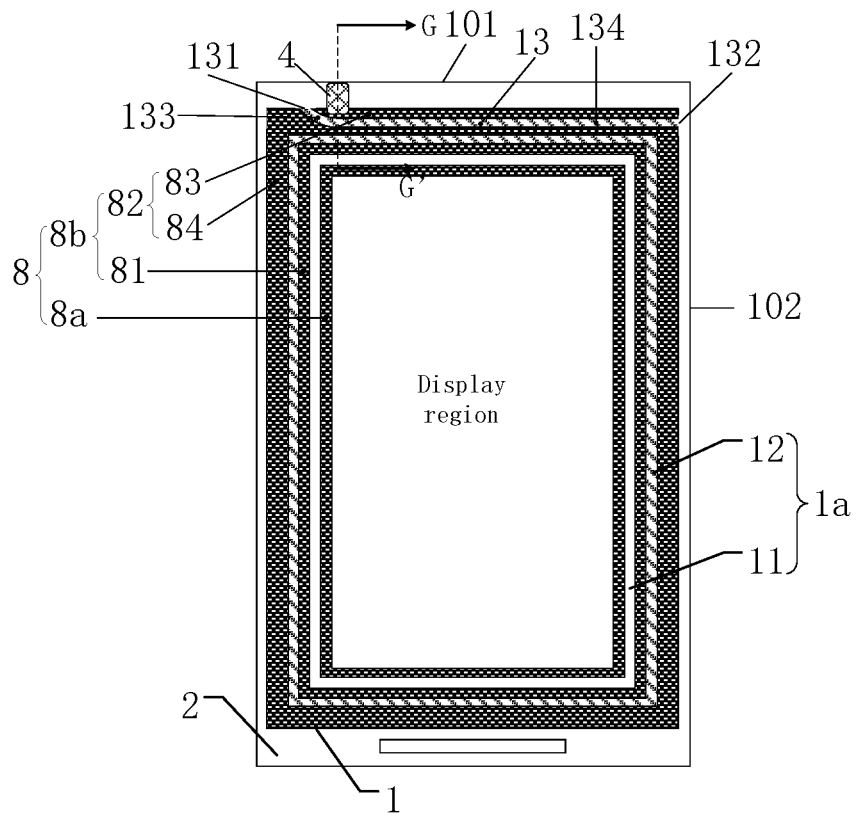
FIG. 11b is a schematic top view of another display panel including a first annular opening, a second annular opening and a non-annular opening provided by an embodiment of the present disclosure.
Figure 11C:
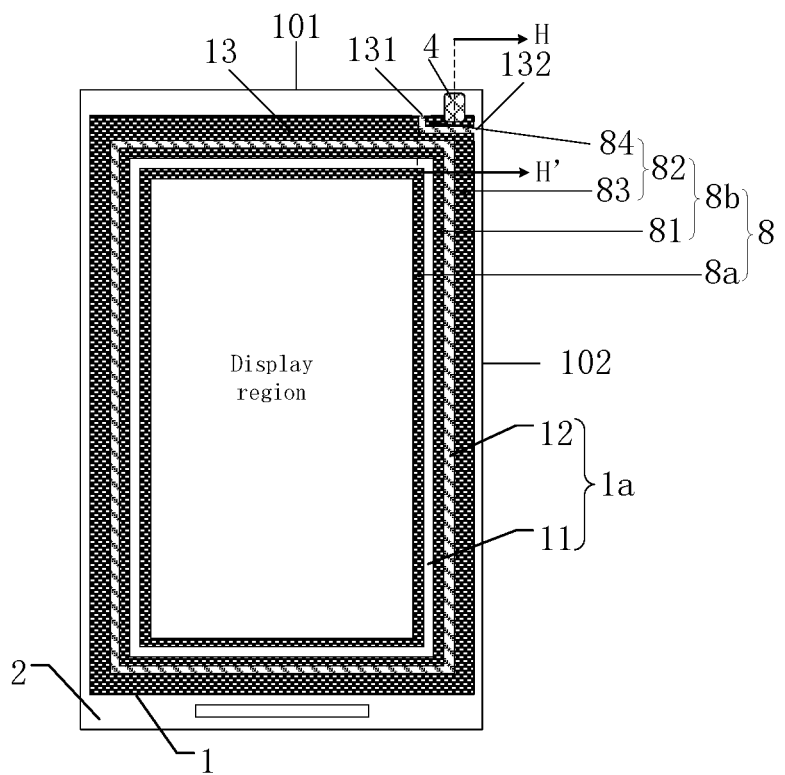
FIG. 11c is a schematic top view of further another display panel including a first annular opening, a second annular opening and a non-annular opening provided by an embodiment of the present disclosure.

For example, in the embodiment illustrated in FIG. 11*c*, the first edge 101 and the second edge 102 are adjacent to each other. And for example, in the embodiment illustrated in FIG. 11*d*, the first edge 101 and the second edge 102 are a same edge.

For example, in the embodiment illustrated in FIG. 11*b*, the planar shape of the non-annular opening 13 comprises a curved strip. For example, the planar shape of the non-annular opening 13 comprises curved strip 134 and a straight strip 135 connected to each other. The planar shape of the non-annular opening 13 is not limited to the above-mentioned cases, no limitation is imposed this in the present disclosure.

As illustrated in FIGS. 12*a* and 12*b*, the non-annular opening 13 totally overlaps the sealant 5 in the direction perpendicular to the opposite substrate 2, which is beneficial to forming a narrower frame of the display panel. In other embodiments, the non-annular opening 13 partially overlaps the sealant 5 in the direction perpendicular to the opposite substrate 2, or does not overlaps the sealant 5 in the direction perpendicular to the opposite substrate 2. In the embodiment illustrated in FIG. 12*a*, the first annular opening 11 is between the sealant 5 and the display region; in another embodiment illustrated in FIG. 12*b*, the first annular opening 11 partially overlaps the sealant 5. Of course, in other embodiments, the first annular opening 11 may totally overlaps the sealant 5. The features about the overlapping cases of the first annular opening 11, the second annular opening 12 and the non-annular opening 13 in different embodiments of the present disclosure can be combined.

For example, in another embodiment of the present disclosure, the conductive adhesive 4 may be electrically connected to the second part 82 of the black matrix layer 8 at a plurality of positions, so as to improve the effect of conducting the static electricity away from the display region.

Figure 11D:
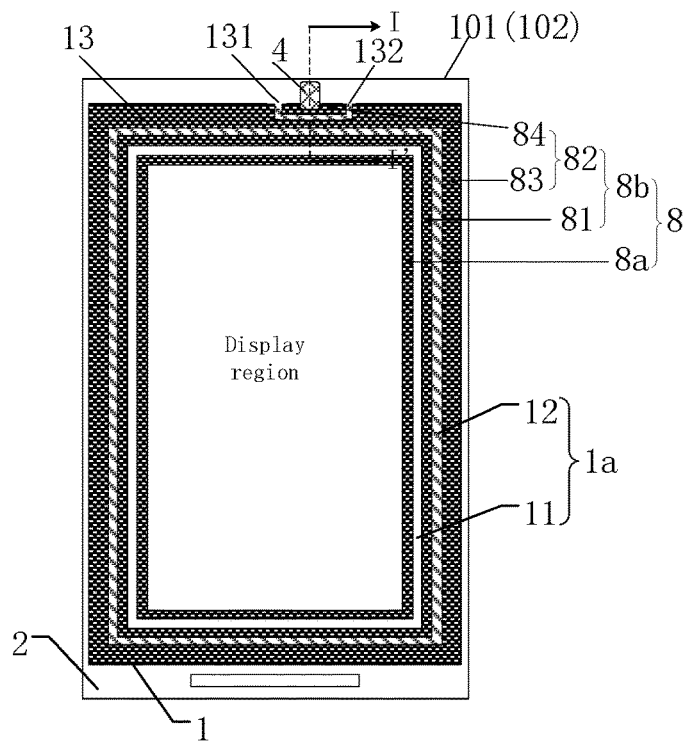
FIG. 11d is a schematic top view of further another display panel including a first annular opening, a second annular opening and a non-annular opening provided by an embodiment of the present disclosure.
Figure 11E:
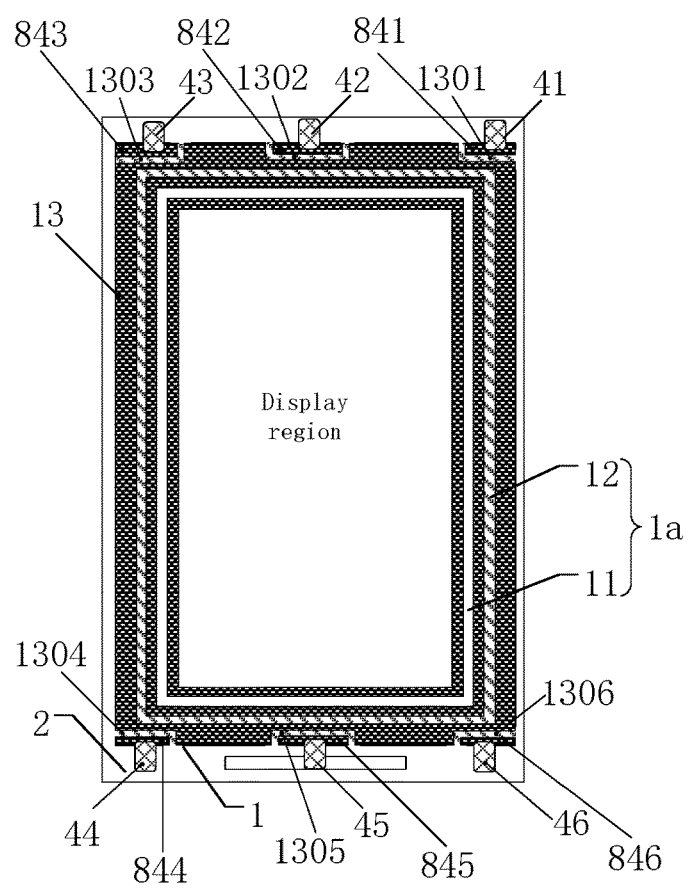
FIG. 11e is a schematic top view of a display panel including a first annular opening, a second annular opening and a plurality of non-annular openings provided by an embodiment of the present disclosure.

As illustrated in FIG. 11*e*, the at least one openings comprise a plurality of the non-annular openings 1301/1302/2303/1304/1305/1306, and the black matrix layer 8 comprises a plurality of the fourth parts; the conductive adhesive 4 is electrically connected to all the plurality of the fourth parts 841/842/843/844. For example, the conductive adhesive 4 comprises a plurality of portions 41/42/43/44/45/46 which are respectively electrically connected to the plurality of the fourth parts 841/842/843/844, so that the static electricity can be conducted away at a plurality of positions at the same time, thus a speed of conducting the static electricity is increased. The plurality of portions 41/42/43/44/45/46 may be successively connected, of are spaced apart from each other, no limitation is imposed to this, as long as the conductive adhesive 4 is electrically connected to all the plurality of the fourth parts of the black matrix layer 8, that is, the conductive adhesive 4 is electrically connected to all the fourth parts of the black matrix layer 8 at a plurality of positions.

It should be noted that the number of the non-annular openings is not limited in the present disclosure, the above embodiment is just exemplary.

For example, as illustrated in FIGS. 12a and 12b, the light-shielding layer 24 overlaps the first annular opening 11 and the second annular opening 12 in the direction perpendicular to the opposed substrate 1 to shield the first annular opening 11, so as to realize the effect of shielding light. On the basis that the light-shielding layer 24 overlaps the first annular opening 11 and the second annular opening 12, the light-shielding layer 24 can also overlap other openings in the at least one opening above to further reduce the light leakage.

For example, the light-shielding layer 24 can be a color filter layer overlapping the first annular opening 11 and the second annular opening 12, and such color filter layer for example includes a red color filter pattern, a green color filter pattern and a blue color filter pattern, referring to FIG. 3a. For example, the blue color filter pattern overlaps the first annular opening and the second annular opening. The features and the technical effect thereof that are not mentioned here of the light-shielding layer 24 can be referred to the descriptions in the above embodiments.

For example, the light-shielding layer 24 can be a metal layer overlapping the first annular opening 11 and the second annular opening 12.

The features that not mentioned here of the embodiment illustrated in FIGS. 12a and 12b, such as the electrostatic shielding layer 9, the groove in the conductive adhesive 4 and so on, are the same as those in the above embodiments, and can be referred to the descriptions in the above embodiments.

Figure 13A:
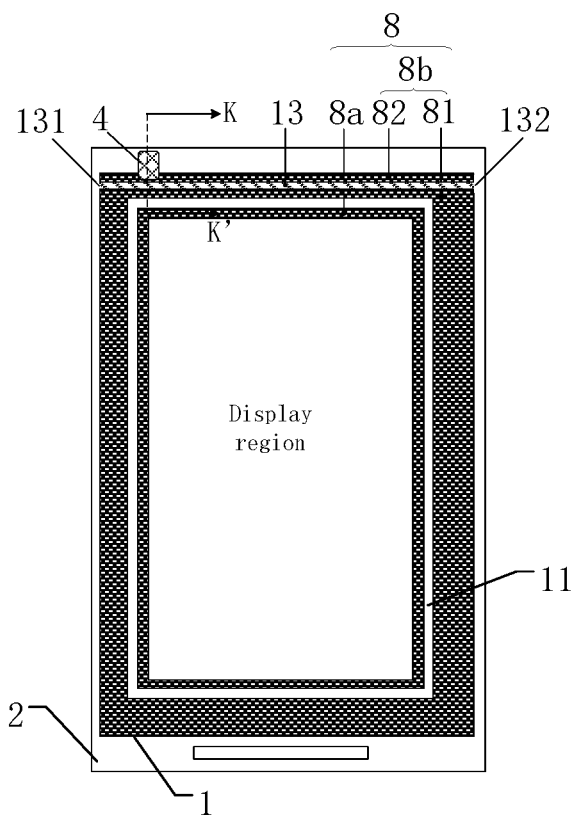
FIG. 13a is a schematic top view of a display panel including a first annular opening and a non-annular opening provided by an embodiment of the present disclosure.

FIG. 13a-FIG. 13d are schematic top views of display panels including a first annular opening and a non-annular opening provided by an embodiment of the present disclosure. As illustrated in FIG. 13a, the display panel comprises a an array substrate 2, an opposed substrate 1 and a black matrix layer 8; the opposed substrate 1 is opposite to the array substrate 2; the black matrix layer 8 is between the array substrate 2 and the opposed substrate 1; the black matrix layer 8 comprises a portion in the peripheral region, at least one opening in the peripheral region is provided in the black matrix layer 8, and the at least one opening comprises a first annular opening 11 and a non-annular opening 13; the first annular opening 11 surrounds the display region, the portion in the peripheral region of the black matrix layer 8 is disconnected at a position of the first annular opening 11, the first annular opening 11 divides the portion in the peripheral region of the black matrix layer 8 into an inner part 8a and an outer part 8b which are not connected to each other, the inner part 8a is on a side, close to the display region, of the first annular opening 11, and the outer part 8b is on a side, away from the display region, of the first annular opening 11; the non-annular opening 13 is in the outer part 8b and is spaced from the first annular opening 11; the outer part 8b is disconnected at a position of the non-annular opening 13, the non-annular opening 13 comprises a first terminal 131 and a second terminal 132, the first terminal 131 is opposite to the second terminal 132 in an extension direction of the non-annular opening 13, and both the first terminal 131 and the second terminal 132 are flush with an edge 80, away from the display region, of the black matrix layer 8; the non-annular opening 13 divides the outer part 8b into a first part 81 and a second part 82 which are not connected to each other, the first part 81 is on a side, close to the display region, of the non-annular opening 13, and the second part 82 is on a side, away from the display region, of the non-annular opening 13. On the basis that the first annular opening 11 is disposed, by providing the non-annular opening 13, for example, the conductive adhesive 4 can be electrically connected to the second part 82 of the black matrix layer 8 and the conductive adhesive is grounded, so that the conductive adhesive 4 can conduct the static electricity away from the display region, and the static electricity can be further prevented from entering the display region of the display panel.

For example, a planar shape of the display panel is a rectangle, the first terminal 131 of the non-annular opening 13 is close to a first edge 101 of the rectangle, and the second terminal 132 of the non-annular opening 13 is close to a second edge 102 of the rectangle. For example, as illustrated in FIG. 13a, the first edge 101 and the second edge 102 are opposite to each other. For example, a planar shape of an entirety of the non-annular opening 13 is a straight strip. In this case, at all positions of the fourth part 84 in the extension direction of the non-annular opening 13, the static electricity can be further prevented from entering the display region of the display panel, and meanwhile it is favorable to realize a narrow frame design.

Figure 13B:
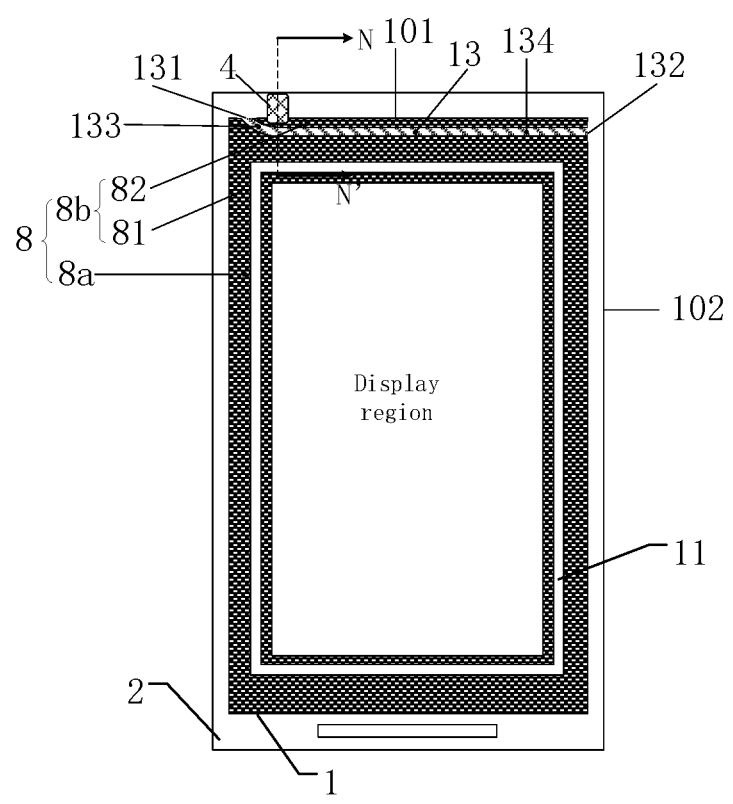
FIG. 13b is a schematic top view of another display panel including a first annular opening and a non-annular opening provided by an embodiment of the present disclosure.
Figure 13C:
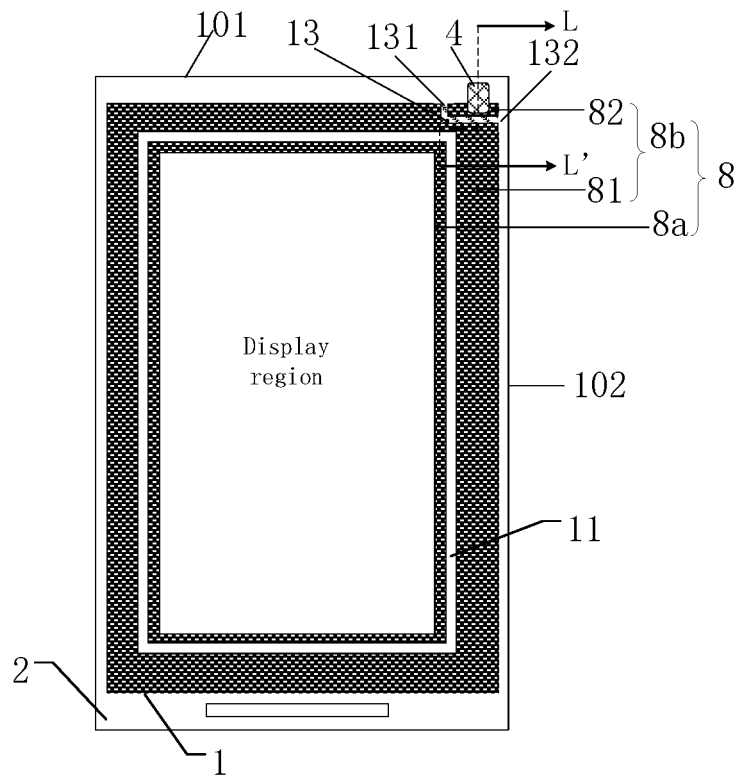
FIG. 13c is a schematic top view of further another display panel including a first annular opening and a non-annular opening provided by an embodiment of the present disclosure.
Figure 13D:
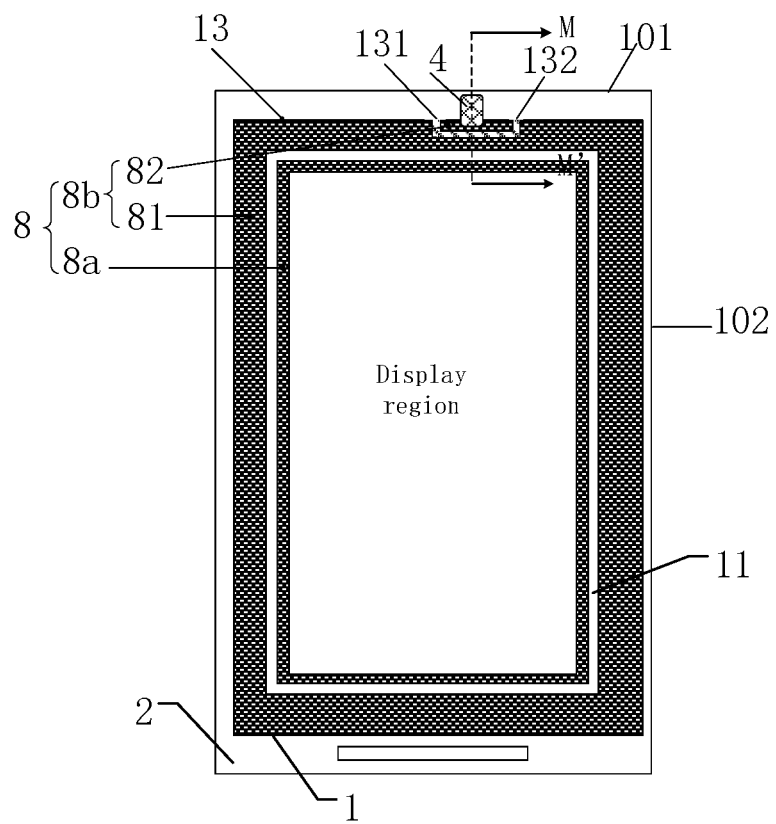
FIG. 13d is a schematic top view of further another display panel including a first annular opening and a non-annular opening provided by an embodiment of the present disclosure.

For example, in the embodiment illustrated in FIG. 13c, the first edge 101 and the second edge 102 are adjacent to each other. And for example, in the embodiment illustrated in FIG. 13d, the first edge 101 and the second edge 102 are a same edge.

For example, as illustrated in FIG. 13a, a planar shape of an entirety of the non-annular opening 13 is a straight strip. In this case, at all positions of the fourth part 84 in the extension direction of the non-annular opening 13, the static electricity can be further prevented from entering the display region of the display panel, and meanwhile it is favorable to realize a narrow frame design.

For example, in the embodiment illustrated in FIG. 13b, the planar shape of the non-annular opening 13 comprises a curved strip. For example, the planar shape of the non-annular opening 13 comprises curved strip 134 and a straight strip 135 connected to each other. The planar shape of the non-annular opening 13 is not limited to the above-mentioned cases, no limitation is imposed this in the present disclosure.

Figure 14:
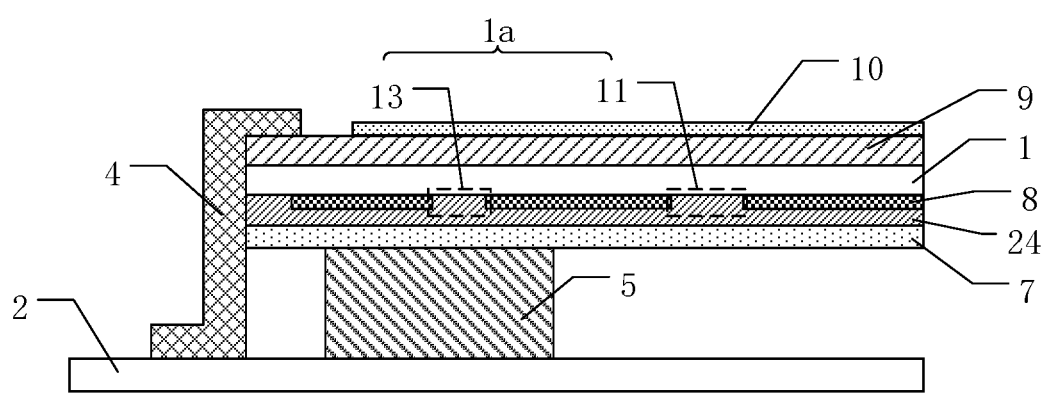
FIG. 14 is a sectional schematic view along any one of K-K' in FIG. 13a, N-N' in FIG. 13b, L-L' in FIG. 13c, M-M' in FIG. 11d.

For example, FIG. 14 is a sectional schematic view along any one of K-K' in FIG. 13a, N-N' in FIG. 13b, L-L' in FIG. 13c, M-M' in FIG. 11d. As illustrated in FIG. 14, the first annular opening 11 is between the sealant 5 and the display region, and the non-annular opening 13 totally overlaps the sealant 5 in the direction perpendicular to the opposite substrate 2, which is beneficial to forming a narrower frame of the display panel. Of course, in other embodiments, the non-annular opening 13 partially overlaps the sealant 5 in the direction perpendicular to the opposite substrate 2 or does not overlaps the sealant 5 in the direction perpendicular to the opposite substrate 2, at the same time, the first annular opening 11 may at least partially overlaps the sealant 5. The features about the overlapping cases of the first annular opening 11 and the non-annular opening 13 in different embodiments of the present disclosure can be combined.

For example, in another embodiment of the present disclosure, the conductive adhesive 4 may be electrically connected to the second part 82 of the black matrix layer 8 at a plurality of positions, so as to improve the effect of conducting the static electricity away from the display region.

For example, in another embodiment of the present disclosure, similar to the non-annular openings in FIG. 11e, the at least one openings comprise a plurality of the non-annular openings, and the black matrix layer comprises a plurality of the second parts; the conductive adhesive is electrically connected to all the plurality of the second parts, so that the static electricity can be conducted away at a plurality of positions at the same time, thus a speed of conducting the static electricity is increased.

The features that are not mentioned of the embodiments illustrated in FIG. 13a-FIG. 13d, such as the light-shielding layer 24, the electrostatic shielding layer 9, the groove in the conductive adhesive 4 and so on, are the same as those in the above embodiments, and can be referred to the descriptions in the above embodiments.

At least another embodiment of the present disclosure provides a display device which includes the display panel in any one of the above embodiments.

For example, the display device provided by the embodiments of the present disclosure can be any product or component with a display function, e.g., a liquid crystal panel, an electronic paper, a mobile phone, a tablet computer, a television, a display, a notebook computer, a digital photo frame, a navigator and the like.

Embodiments of the above display panel and display device can be referred to. Besides, in the case of no conflict, features in one embodiment or in different embodiments can be combined.

What are described above is related to the illustrative embodiments of the disclosure only and not limitative to the scope of the disclosure.

What is claimed is:

1. A display panel, having a display region and a peripheral region on a periphery of the display region, and comprising:
    an array substrate;
    an opposed substrate, opposite to the array substrate; and
    a black matrix layer, between the array substrate and the opposed substrate, wherein the black matrix layer comprises a portion in the peripheral region, at least one opening in the peripheral region is provided in the black matrix layer, and the at least one opening comprises:
    a first annular opening surrounding the display region, wherein the portion in the peripheral region of the black matrix layer is disconnected at a position of the first annular opening, the first annular opening divides the portion in the peripheral region of the black matrix layer into an inner part and an outer part which are not connected to each other, the inner part is on a side, close to the display region, of the first annular opening, and the outer part is on a side, away from the display region, of the first annular opening; and
    a second annular opening surrounding the first annular opening and on a side, away from the display region, of the first annular opening, wherein the outer part is disconnected at a position of the second annular opening, the second annular opening divides the outer part in the peripheral region into a first part and a second part which are not connected to each other, the first part is on a side, close to the display region, of the second annular opening, and the second part is on a side, away from the display region, of the second annular opening; both the first annular opening and the second annular opening are closed annular.

2. The display panel according to claim 1, further comprising:
    a conductive adhesive connected to the opposed substrate and the array substrate, and electrically connected to the second part of the black matrix layer, and the conductive adhesive is grounded.

3. The display panel according to claim 2, further comprising:
    a sealant, in the peripheral region so that the array substrate and the opposed substrate are bonded to form a cell, wherein
    the first annular opening at least partially overlaps the sealant in a direction perpendicular to the array substrate or is between the sealant and the display region, and the second annular opening at least partially overlaps the sealant in the direction perpendicular to the array substrate or is between the sealant and the display region.

4. The display panel according to claim 3, wherein the conductive adhesive is on a side, away from the display region, of the sealant.

5. The display panel according to claim 3, further comprising:
    a non-annular opening in the second part and spaced apart from the second annular opening, wherein
    the second part is disconnected at a position of the non-annular opening, the non-annular opening comprises a first terminal and a second terminal, the first terminal is opposite to the second terminal in an extension direction of the non-annular opening, and both the first terminal and the second terminal are flush with an edge, away from the display region, of the black matrix layer;
    the non-annular opening divides the second part into a third part and a fourth part which are not connected to each other, the third part is on a side, close to the display region, of the non-annular opening, and the fourth part is on a side, away from the display region, of the non-annular opening;
    the fourth part is electrically connected to the conductive adhesive.

6. The display panel according to claim 5, wherein a planar shape of the display panel is a rectangle, the first terminal of the non-annular opening is close to a first edge of the rectangle, and the second terminal of the non-annular opening is close to a second edge of the rectangle;
    the first edge and the second edge are opposite to each other, or the first edge and the second edge are a same edge, or the first edge and the second edge are adjacent to each other.

7. The display panel according to claim 5, wherein a planar shape of an entirety of the non-annular opening is a straight strip, or a planar shape of the non-annular opening comprises a curved strip.

8. The display panel according to claim 5, wherein the non-annular opening at least partially overlaps the sealant in the direction perpendicular to the opposite substrate.

9. The display panel according to claim 2, wherein the conductive adhesive is electrically connected to the second part of the black matrix layer at a plurality of positions.

10. The display panel according to claim 5, wherein the at least one openings comprise a plurality of the non-annular openings, and the black matrix layer comprises a plurality of the fourth parts; the conductive adhesive is electrically connected to all the plurality of the fourth parts.

11. The display panel according to claim 1, further comprising an electrostatic shielding layer, wherein the electrostatic shielding layer is on a side, away from the array substrate, of the opposed substrate.

12. The display panel according to claim 1, further comprising a light-shielding layer, wherein the light-shielding layer is between the opposed substrate and the array substrate and the light-shielding layer overlaps the first annular opening and the second annular opening at a direction perpendicular to the array substrate.

13. The display panel according to claim 12, wherein the light-shielding layer comprises a color filter layer overlapping the first annular opening and the second annular opening.

14. The display panel according to claim 13, wherein the color filter layer comprises a blue color filter pattern, and the blue color filter pattern overlaps the first annular opening and the second annular opening.

15. The display panel according to claim 12, wherein the light-shielding layer comprises a metal layer overlapping the first annular opening and the second annular opening.

16. The display panel according to claim 2, wherein a groove is in the conductive adhesive, and the groove separates the conductive adhesive from the black matrix layer.

17. A display device, comprising the display panel according to claim 1.

18. A display panel, having a display region and a peripheral region on a periphery of the display region, and comprising:
   an array substrate;
   an opposed substrate, opposite to the array substrate; and
   a black matrix layer, between the array substrate and the opposed substrate, wherein the black matrix layer comprises a portion in the peripheral region, at least one opening in the peripheral region is provided in the black matrix layer, and the at least one opening comprises:
   a first annular opening surrounding the display region, wherein the portion in the peripheral region of the black matrix layer is disconnected at a position of the first annular opening, the first annular opening divides the portion in the peripheral region of the black matrix layer into an inner part and an outer part which are not connected to each other, the inner part is on a side, close to the display region, of the first annular opening, and the outer part is on a side, away from the display region, of the first annular opening; and
   a non-annular opening in the outer part and spaced from the first annular opening, wherein the outer part is disconnected at a position of the non-annular opening, the non-annular opening comprises a first terminal and a second terminal, the first terminal is opposite to the second terminal in an extension direction of the non-annular opening, and both the first terminal and the second terminal are flush with an edge, away from the display region, of the black matrix layer;
   the non-annular opening divides the outer part into a first part and a second part which are not connected to each other, the first part is on a side, close to the display region, of the non-annular opening, and the second part is on a side, away from the display region, of the non-annular opening.

19. The display panel according to claim 18, wherein a planar shape of the display panel is rectangle, the first terminal of the non-annular opening is close to a first edge of the rectangle, and the second terminal of the non-annular opening is close to a second edge of the rectangle;
   the first edge and the second edge are opposite to each other, or the first edge and the second edge are a same edge, or the first edge and the second edge are adjacent to each other.

20. The display panel according to claim 19, further comprising:
   a conductive adhesive connected to the opposed substrate and the array substrate, and electrically connected to the second part of the black matrix layer, and the conductive adhesive is grounded.

* * * * *